United States Patent Office 3,259,640
Patented July 5, 1966

3,259,640
17α-Δ⁴-PREGNENE-12α-ACYLATE-3,20-DIONE AND PROCESS FOR THE PRODUCTION THEREOF
Patrick Andrew Diassi, Westfield, N.J., assignor, by mesne assignments, to E. R. Squibb & Sons, Inc., New York, N.Y., a corporation of Delaware
No Drawing. Filed Nov. 29, 1963, Ser. No. 327,044
3 Claims. (Cl. 260—397.45)

This invention relates to and has as its object the provision of new and physiologically active steroids and processes for their production.

More particularly, this invention relates to the preparation of steriods of the formula:

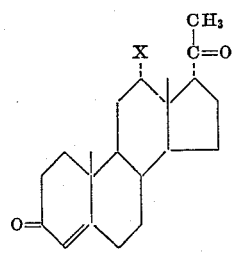

wherein X is acyloxy.

The final products of this invention are physiologically active compounds which possess progestational activity and may be employed instead of progesterone, for example, in the treatment of habitual abortion, for which purpose they can be administered in the same manner as progesterone, for example, the dosage being adjusted for the relative potency of the particular steroid.

The preferred acyl and acyloxy radicals are those of hydrocarbon carboxylic acids of less than twelve carbon atoms, as exemplified by the lower alkanoic acids (e.g. acetic, propionic, butyric and tert-pentanoic acids), the lower alkanoic acids, the monocyclic aryl carboxylic acids (e.g., benzoic and toluic acids), the monocyclic aryl lower alkanoic acids (e.g., phenacetic and β-phenylpropionic acid), the cycloalkane carboxylic acids and the cycloalkene carboxylic acids.

The final products of this invention are prepared according to the process of this invention, beginning with a compound of the formula:

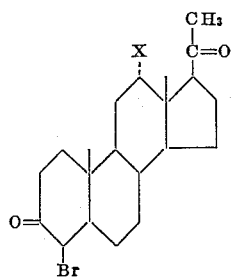

wherein X is as hereinbefore defined, as starting material.

The starting material is treated with lithium chloride in dimethylformamide to yield the new 17α final products of this invention.

The invention may be further illustrated by the following example:

Example 1.—17α-Δ⁴-pregnene-12α-ol-3,20-dione 12-acetate

A mixture of 67.2 g. of 4β-bromo-5β-pregnane-12α-ol-3,20-dione 12-acetate and 19.4 g. of lithium chloride in 750 ml. of dimethylformamide is heated under nitrogen on a steam bath for three hours. The solution is then evaporated to about 325 ml. and diluted with 75 ml. of water whereupon crystals of 12α-acetoxyprogesterone separate. These crystals are filtered and washed with water. The filtrate is then extracted with chloroform which is washed with 5% $NaHCO_3$ and then water and evaporated to dryness. Fractional crystallization of the residue gives 1.26 g. of 17α-Δ⁴-pregnene-12α-ol-3,20 dione 12-acetate having M.P. 224–226°, $[\alpha]_D^{22}$ +126° (chf.);

$$\lambda_{max}^{alc.}\ 239\ m\mu\ (\epsilon = 16,200)$$

Analysis.—Calc'd for $C_{23}H_{32}O_4$ (372.49): C, 74.16; H, 8.30. Found: C, 74.67; H, 8.32.

The invention may be variously otherwise embodied within the scope of the appended claims.

What is claimed is:

1. A compound of the formula:

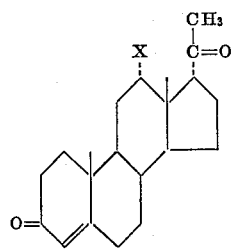

wherein X is acyloxy, wherein the acyl radical is of a hydrocarbon carboxylic acid of less than twelve carbon atoms.

2. 17α,Δ⁴-pregnene-12α-ol-3,20-dione 12-acetate.

3. A process for preparing a compound of the formula

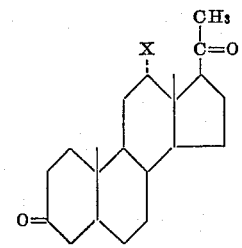

wherein X is acyloxy, wherein the acyl radical is of a hydrocarbon carboxylic acid of less than twelve carbon atoms which comprises reacting a compound of the formula:

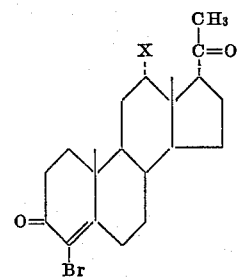

wherein X is as defined in claim 1, with lithium chloride in dimethylformamide.

References Cited by the Examiner
UNITED STATES PATENTS
2,142,170   1/1939   Bockmuhl et al. ___ 260—397.45

OTHER REFERENCES
Rubin, "Steroids," Nov. 15, 1963, page 575 relied on.

LEWIS GOTTS, Primary Examiner.
ELBERT L. ROBERTS, Examiner.

UNITED STATES PATENT OFFICE
CERTIFICATE OF CORRECTION

Patent No. 3,259,640                                              July 5, 1966

Patrick Andrew Diassi

It is hereby certified that error appears in the above numbered patent requiring correction and that the said Letters Patent should read as corrected below.

Column 2, lines 32 to 41, the formula should appear as shown below instead of as in the patent:

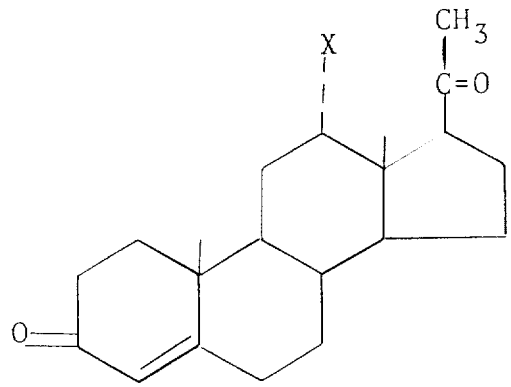

same column 2, lines 48 to 57, the formula should appear as shown below instead of as in the patent:

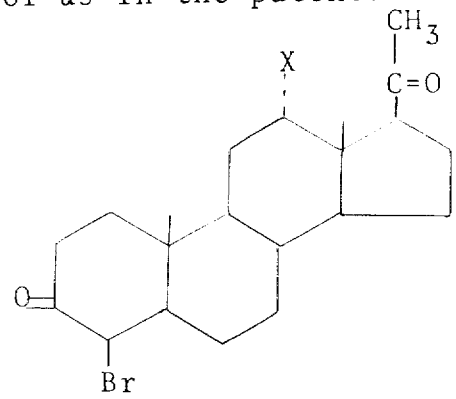

Signed and sealed this 1st day of August 1967.

(SEAL)
Attest:

EDWARD M. FLETCHER, JR.                                  EDWARD J. BRENNER